United States Patent
Logan et al.

(10) Patent No.: US 9,288,303 B1
(45) Date of Patent: Mar. 15, 2016

(54) FACEBACK—AUTOMATED RESPONSE CAPTURE USING TEXT MESSAGING

(71) Applicant: Twin Harbor Labs, LLC, Plano, TX (US)

(72) Inventors: James D Logan, Candia, NH (US); Richard A Baker, Jr., West Newbury, MA (US)

(73) Assignee: Twin Harbor Labs, LLC, Plano, TX (US)

( * ) Notice: Subject to any disclaimer, the term of this patent is extended or adjusted under 35 U.S.C. 154(b) by 0 days.

(21) Appl. No.: 14/857,777

(22) Filed: Sep. 17, 2015

Related U.S. Application Data (60) Provisional application No. 62/052,172, filed on Sep. 18, 2014.

(51) Int. Cl.
| | |
|---|---|
| H04W 4/12 | (2009.01) |
| H04M 1/725 | (2006.01) |
| H04N 7/18 | (2006.01) |
| G06F 3/01 | (2006.01) |
| G06K 9/00 | (2006.01) |
| H04L 12/58 | (2006.01) |

(52) U.S. Cl.
CPC ........... *H04M 1/72555* (2013.01); *G06F 3/013* (2013.01); *G06K 9/00228* (2013.01); *G06K 9/00302* (2013.01); *H04L 51/08* (2013.01); *H04N 7/185* (2013.01); *H04W 4/12* (2013.01)

(58) Field of Classification Search
CPC .... H04W 4/12; H04M 1/72555; H04L 51/08; H04N 7/185
USPC ...................................................... 455/412.1
See application file for complete search history.

(56) References Cited

U.S. PATENT DOCUMENTS

| | | | |
|---|---|---|---|
| 6,990,452 B1 | 1/2006 | Ostermann et al. | |
| 8,210,848 B1 | 7/2012 | Beck et al. | |
| 8,989,786 B2 | 3/2015 | Feghali | |
| 2002/0072952 A1* | 6/2002 | Hamzy | G06Q 30/02 705/7.29 |
| 2002/0143881 A1* | 10/2002 | DeLaCruz | H04L 51/30 709/206 |

(Continued)

FOREIGN PATENT DOCUMENTS

| | | |
|---|---|---|
| CN | 101087332 A | 12/2007 |
| CN | 101883339 A | 11/2010 |

(Continued)

OTHER PUBLICATIONS

Feijo, Jackson set al, "Emotion-enhanced Mobile Chat—Conveying Emotions in Mobile Text Chat", Proceedings of the 2nd International Conference on Human-Computer Interaction, Prague, Czech Republic, Aug. 14-15, 2014.

(Continued)

*Primary Examiner* — Nathan Taylor
(74) *Attorney, Agent, or Firm* — Richard A. Baker, Jr.

(57) ABSTRACT

The FaceBack system incorporates an automated mechanism for remotely capturing the reaction of the receiver of a text message. This mechanism is started when the texter incorporates instructions into a text message to take a photo or record a video when the text is read by a receiver. The receiving device scans the incoming text message and takes a photo or records a video of the receiving user when the user reads the text message. Once the video is recorded or the picture is taken, the video or picture is returned to the texter through the SMS system.

16 Claims, 3 Drawing Sheets

(56) References Cited

U.S. PATENT DOCUMENTS

| | | | |
|---|---|---|---|
| 2004/0148176 A1 | 7/2004 | Scholl | |
| 2005/0078804 A1 | 4/2005 | Yomoda | |
| 2007/0070181 A1 | 3/2007 | Oh et al. | |
| 2007/0094330 A1 | 4/2007 | Russell | |
| 2008/0151038 A1 | 6/2008 | Khouri et al. | |
| 2008/0274798 A1* | 11/2008 | Walker | G07F 17/32 463/25 |
| 2010/0240405 A1 | 9/2010 | Camp | |
| 2011/0219080 A1* | 9/2011 | McWithey | H04M 1/72552 709/206 |
| 2013/0128058 A1* | 5/2013 | Sagayaraj | H04N 5/225 348/207.1 |
| 2013/0147933 A1 | 6/2013 | Kulas | |
| 2015/0031342 A1* | 1/2015 | Lorenzo | H04W 4/16 455/414.1 |
| 2015/0110471 A1* | 4/2015 | Zheng | H04N 5/76 386/291 |
| 2015/0288875 A1* | 10/2015 | Garcia Manchado | H04N 5/232 348/207.1 |

FOREIGN PATENT DOCUMENTS

| | | |
|---|---|---|
| CN | 102104658 A | 6/2011 |
| CN | 103647870 A | 3/2014 |
| CN | 104412258 A | 3/2015 |
| EP | 2391105 A1 | 11/2011 |
| KR | 200800020714 A | 3/2008 |
| WO | 02080107 A1 | 10/2002 |

OTHER PUBLICATIONS

Truong, Alice, "This chat app sends a new selfie with every message", Fast Company, Dec. 5, 2013, downloaded from http://www.fastcompany.com/3023040/fast-feed/this-chat-app-sends-a-new-selfie-with-every-message on Sep. 10, 2015.

Iozzio, Corinne, "An App That Captures Emotions in Real Time", Smthsonian.com, Jun. 27, 2014, web page downloaded from http://www.smithsonianmag.com/innovation/app-captures-emotions-real-time-180951878/?no-ist on Aug. 22, 2014.

Mera, Kazuya et al, "Interactive Mobile Communication System with Facial Expression Extracting Emotion", Fourth Internatioanl Workshop on Computational Intelligence and Applications, IEEE SMC Hiroshima Chapter, Hiroshima University, Japan, Dec. 10-11, 2008.

Takacs, Barnabas, et al, "A Mobile System for Assisted Living with Ambient Facial Interfaces", IADIS International Journal on Computer Science and Information Systems, vol. 2, No. 2, pp. 33-50, ISSN: 1646-3692, Oct. 2007.

Zhu, Jiejie, et al, "Virtual Avatar Enhanced Nonverbal Communication from Mobile Phones to PCs", Edutainment 2008, LNCS 5093, Springer-Verlag, pp. 551-561, 2008.

Madan, Anmol, et al, "VibeFones: Socially Aware Mobile Phones", IEEE, 2006.

Oshita, Jyunchi, "New SMS Technology Attaches 'Facial Expression' to Message", Nikkei Technology, Sep. 4, 2012, web page downloaded from http://techon.nikkeibp.co.jp/english/NEWS_EN/20120904/237753/ on Aug. 22, 2014.

Fuentes, Juan, et al, "Emo Text", for MIT Class COMP 441: Human Computer Interactions (Spring 2014).

"AppStore, The new expressive way to chat . . . ", web page downloaded from http://www.reactapp.com/ on Aug. 22, 2014.

Sundstrom, Petra, et al, "eMoto—Affectively Involving both Body and Mind", CHI 2005, Apr. 2-7, 2004, Portland, Oregon, USA.

Sundstrom, Petra, et al, "In Situ Informants Exploring an Emotional Mobile Messaging System in Their Everyday Practice", International Journal of Human-Computer Studies archive vol. 65 Issue 4, Apr. 2007, pp. 388-403.

Morris, Paul, "This App Lets Android Users See Who Is Trying to Read Their Messages", Redmond Pie, Nov. 30, 2013, web page downloaded from http://www.redmondpie.com/this-app-lets-android-users-see-who-is-trying-to-read-their-messages/ on Aug. 22, 2014.

* cited by examiner

Sample SMS Message 301

07 91 91 87 63 13 07 F0 11 00 0B 91 91 87 52 47 01 F1 00 00 AA 19 AA EC BB 2E 07 C1 C3
F4 B2 9B 0E 52 D7 E7 74 50 7A 3E AF 97 C9 2A

SMS Message Decoded

| Description | format | In this example | Octet |
|---|---|---|---|
| Length of the SMSC information 310 | hex-octet | 7 octets | 07 |
| Type of address of SMSC 311 | hex-octet | international format | 91 |
| SMSC number 312 | decimal semi-octets | 19783631700 | 91 87 63 13 07 F0 |
| First octet of this SMS-DELIVER message 313 | hex-octet | TP-MMS | 11 00 |
| Length of the sender address 314 | hex-octet | 11 (decimal) | 0B |
| Type of address of the sender number 315 | hex-octet | ... | 91 |
| Sender number 316 | decimal semi-octets | 19782574101 | 91 87 52 47 01 F1 |
| Protocol identifier 317 | hex-octets | ... | 00 |
| Data encoding scheme 318 | hex-octets | ... | 00 |
| Time stamp 319 | decimal semi-octets | ... | AA |
| Length of User data (SMS message) 320 | hex-octets | 25 (decimal) | 19 |
| User data 321 | 8-bit octets representing 7-bit data | *Your patent just issued* | AA EC BB 2E 07 C1 C3 F4 B2 9B 0E 52 D7 E7 74 50 7A 3E AF 97 C9 2A |

Figure 3

FACEBACK—AUTOMATED RESPONSE CAPTURE USING TEXT MESSAGING

RELATED APPLICATIONS

This patent application claims the benefit of U.S. Provisional Application Ser. No. 62/052,172, filed Sep. 18, 2014, entitled "FACEBACK: AUTOMATED RESPONSE CAPTURE USING TEXT MESSAGING", the entire provisional patent application of which is herein incorporated by reference.

BACKGROUND OF INVENTION

1. Field of the Invention

The present invention is directed to text messaging applications and is more specifically related to the exchange of photographs and video using such text messaging applications.

2. Description of the Related Art

Text messages have been sent since 3 Dec. 1992, when Neil Papworth, a test engineer for Sema Group in the UK used a personal computer to send the text message "Merry Christmas" via the Vodafone network to the phone of Richard Jarvis. In the ensuing decades, billions of SMS messages have been transferred between phones, messages that first contained text messages, then photos, and later videos. In each case the communications has been driven by the sender (the "texter") sending a message to the receiver, who must respond to the text when appropriate. SMS messages are limited to 160 characters, so messages are often abbreviated and the emotions of both the texter and the receiver are often lost in the brevity of the message.

This lack of emotion in text messages was first addressed with the addition of photographs and later videos to the SMS protocol and to the text messaging applications. But the video and photos are often separated from text, thus blunting the effect.

To resolve this, a number of new applications have arisen in recent years to add emoticons to text messages. A group in Sweden created eMoto to bring emoticons to text messages, and similar work has been published by groups from the Hungarian Academy of Science, AT&T, Docomo Communications Laboratories Europe GmbH, Hiroshima City University, and React Limited. While each of these applications allow the user to insert emotions into their text message through avatars, none show the true emotion on the face of the recipient as the message is read.

EmoText, a MIT Computer Science 441 project in the spring of 2014 discusses the use of facial recognition to interpret the emotion of the receiver of a text message. The emotion is interpreted and an avatar is sent back to the original texter with the emotions.

But EmoText only describes the computer interpretation of the emotion of the receiver of the text message. The actual emotion is lost in the medium of the SMS message. The receiver's face is not seen by the texter.

The present invention, referred to herein by the short-hand expression "FaceBack", eliminates the issues articulated above as well as other issues with the currently known products.

SUMMARY OF THE INVENTION

One aspect of the present invention takes the form of a method for receiving text message whereby the text message is scanned for a metacharacter, set of metacharacters, or other delineating information, dictating that the camera on the receiving device should take a photograph, and if the metacharacter is detected, taking a photograph using the phone's camera of the face of the recipient of the message, the response photo, and then sending the photograph back, using a text message, to the address of the device that sent the original text message.

In a further feature of the method, the photograph could be replaced with a brief video, operated, in some embodiments, as just described for photographs. Another further feature could have an eye tracking system determine when the receiver's eyes read the area of the text associated with the metacharacter and take either the photograph or the video in the approximate time when the text is read. A further aspect of this method provides a time delay before taking the picture or stopping the video. A further aspect of the method includes the steps of requesting permission from the receiver before sending the photograph or video.

Another aspect of the present invention takes the form of an apparatus for processing text messages containing a phone, a camera, a network interface, and a screen, where the apparatus is configured to receive electronically a text message from the network and display the message on the screen, activate the camera to take a picture of the user when the text message is on the screen, and then send this response picture in reply to the text message.

In a further feature of the apparatus, the photograph could be replaced with a brief video. Another further feature could have an eye tracking system determine when the receiver's eyes read the area of the text of interest to the texter as indicated by the placement of one or more metacharacters and take either the photograph or the video when the text is read. A further aspect of this apparatus involves a time delay before taking the picture or stopping the video. A further aspect of the apparatus includes a permission apparatus that requests permission from the receiver before sending the photograph or video.

DETAILED DESCRIPTION OF THE INVENTION

The present invention addresses the limitations of text messages regarding the transmission of emotions while messaging with SMS messages or similar systems, and particularly address the issue of allowing the texter to see the receiver's emotions when the message, or pertinent part of a message, is read. Since the receiver is rarely in the same location as the texter, the texter cannot see how the text message is received by the receiver using existing SMS messaging techniques. If the text messaging applications are modified to allow metacharacters to be inserted in SMS messages, a texter could direct the cell phone camera on the receiver's cell phone to take a photograph or a video of the receiver, and then transmit the photo back to the texter, allowing the texter to see the receiver's face when the message is read. Additional permissions may be implemented by the receiver to always allow, to allow only for designated messages, or to always deny permission to take and send the photo or video. Such permissions may be texter-specific, that is, applying to certain senders of messages but not others. Permissions to take the photograph may be implemented in the setup of the text application, and modified as needed thereafter.

For convenience and readability of the following text, we will use the term video to describe the taking of the image of the receiver, although the inventors envision that a photograph could be taken as well as a video, or even both. The term video could include the recording of a moving image in 2D or 3D, recording of sound, or the recording of both image and sound, or simply could be a still photograph or a series of photographs. In one embodiment, audio generated by the recipient could be processed through a voice recognition program to convert the audio into text, and incorporating such text along with the video or photograph being returned to the texter. Furthermore, when we discuss a phone in the following text, any device that sends and receives an SMS message, or similar message, could be used, such as a cell phone, a smart phone, a tablet, a laptop, a personal computer, smart watch, and any other similar device. While the description in this document describes a text message based system, the text message could be replaced with an email, chat, Viber, iMessage, WhatApp, Snapchat messages (video, photo, or text), instant, video or voice messaging systems, or voicemail. The messages could include embedded metacharacters or other similar mechanism or protocols that cause a photo or video to be recorded at the time, or slightly thereafter, that a message or relevant part of a message as delineated by metacharacters is read and then returned to the sender. For video or audio messaging, a tone could be used in one embodiment instead of the metacharacter to indicate when to take the photo. Throughout this document the use of SMS is meant to include either SMS, XMPP, or MMS or other protocols.

Figure 1:
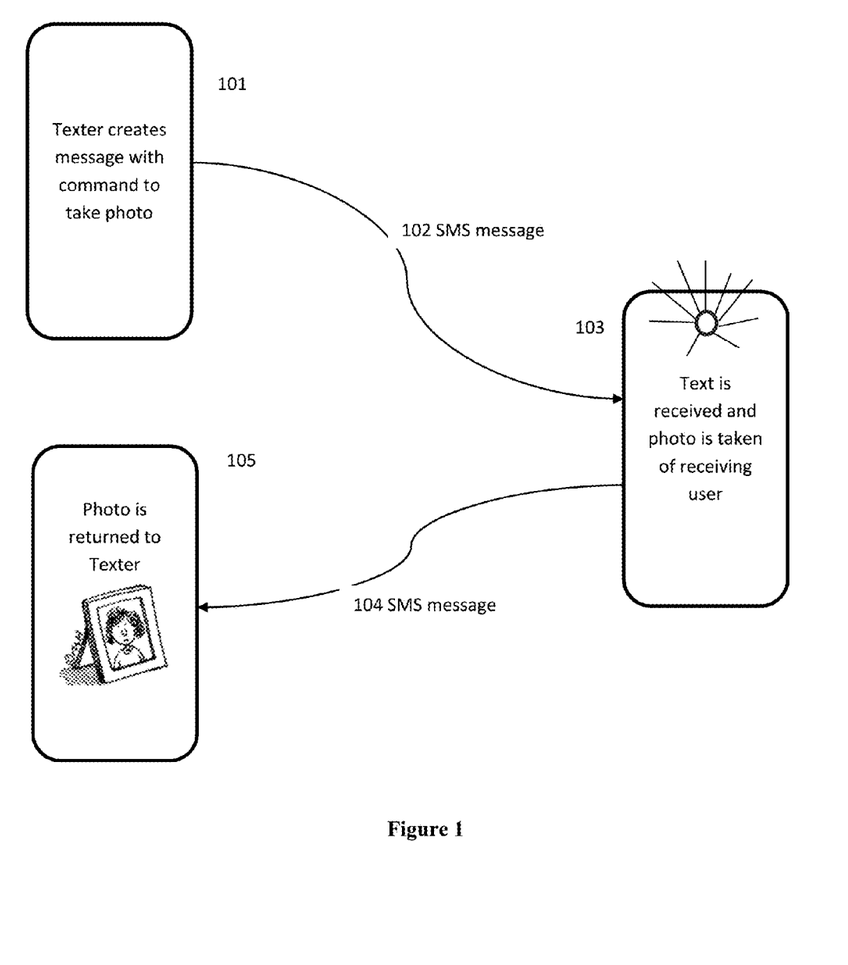
FIG. 1 is a diagram of the FaceBack system showing the text messages flowing between the phones.

Turning to FIG. 1, we see the path of SMS messages 102 between the phones 101 and 103. The texter's phone 101 runs a standard text message creation application that has been modified to allow metacharacters to be inserted into SMS messages 102. For instance, a command to start taking a video on the receiver's phone 103 could be encoded as hexadecimal character 0x13 and to turn off the video on the receiver's phone 103 as hexadecimal character 0x14. The text message application on the texter's phone 101 may have an icon of a green video camera that inserts 0x13 into the SMS message 102 when the texter selects the icon. A red video camera icon could indicate the insertion of 0x14 into the SMS message 102. Alternatively, a function key or ALT key combination with a second character could be used to insert the metacharacters.

In a photograph implementation, an icon of a camera could indicate that metacharacter 0x14 is inserted in the SMS message 102. However, the specific icon or metacharacters could be implemented using other icons and character choices without departing from the spirit of this invention.

Alternatively, the texter could delineate the portion of the text of interest by highlighting such text and perhaps pressing a key representing the metacharacter insertion. The camera would focus on filming the recipient while reading this segment including a time period after the reading was finished.

Once the texter completes the SMS message 102 using the text message application on the texter's phone 101, the SMS message 102 is sent to the receiver's phone 103. When the message is received by the receiver's phone 103, the SMS message 102 is stored until the receiver reads the message. As the receiver reads the message using a text message application on the receiver's phone 103, the video is turned on when the receiver's eyes reach the location in the text message where the command to turn on the video is located and then turned off when the receiver's eyes reach the location of the video off command.

When the video is turned off, the text application on the receiver's phone 103 assembles the video into an SMS message 104 for transmission back to the texter's phone 105 (and 101).

There may be some concern about the taking of videos without the user's permission or at times that are not appropriate. The receiver's text message application may require that the receiver grant permission before hand to allow videos to be taken. This permission may be based for all texters or only for certain texters. Therefore, texters may ask specific friends and contacts to opt in to the feature. Permission may be granted by the receiver to specific texters and not to others. Or the text message application may be set up to deny permission to take any videos regardless of the texter. While giving permission to have one's video taken would make less sense on a text-by-text basis (as such an action would impact the candidness of a given shot), the UI for the texting application could make it convenient for a recipient to temporarily turn off the feature for a given texter whenever that was desired.

In another embodiment, a visual indicator would be apparent and associated with a specific incoming text to let the recipient know that a response text has been requested. The indicator could also show where in such an incoming text the response photo has been requested to be generated. In such an embodiment, the recipient is being asked to generate a facial expression in regards to a specific text or text part, rather than a candid photo or video being generated.

In another embodiment, a visual indicator would be apparent, perhaps in each message and or in the general contacts list, to remind recipients that they had given permission for a specific texter to be sent response texts.

In one embodiment, the response video is displayed on the receiver's phone and the receiver is prompted to give permission to send the message back to the texter. The prompts could be send, deny, or redo. Redo allows the receiver to record a new video or to replace the video with a saved video (the receiver could also incorporate an HTML link or a link to a video in the response). The receiver could also be prompted to comment on the video, in text or audio, before returning the message. Or such annotations could be a normal part of the process and require no prompting. In the case where multiple photographs are taken, the receiver may choose which one to return to the texter. Or the receiver may choose to edit the video before returning.

The SMS message 104 is then sent to the texter's phone 101 and 105. The texter can then watch the video to see the receiver as the text message is read using a standard text message application. In a further enhancement, the original recipient could activate a request to see the original texter's response when that person saw the video that was sent back after seeing the original text. With this enhancement, a series of ping-pong response videos could be generated and sent.

In one embodiment, the original text message could be returned with the video to the texter so that the texter know which message the video relates to. This may be important in the case where the texter has sent multiple messages to the receiver before the receiver has read the first message, to allow the texter to understand which message the video relates to. In another implementation the problem of identifying to which text message the video applies could be solved by inserting the reaction video back into the stream of texts sent that appear on the texter's phone, thus leaving the original text and the reaction video in the chronological order of the texter's message stream.

In other embodiments, the texter indicates that a video is to be taken when the receiver reads a text message by setting a flag in the header of the text message indicating that the receiver's video should be taken. In another embodiment, the texter enters a time after the receiver starts reading the message to take the video or a percentage of the message to be read before taking the video. This percentage or time value are placed in to the header of the text message. When received, the receiver's text message application will wait the specified amount of time and then take the video. Or the receiver's text message application will wait until the receiver has read the specified percentage of the message, as determined via eye-tracking or head orientation software, before taking the video. The reaction video is then returned to the texter.

If the video consists of a series of still photographs, the photos could be analyzed by software on the receiver's phone to select the best photo to use. Or a video could be analyzed for the best still image, or segment of video to use. Alternatively, the receiver could be prompted to choose the best photo in the series (or video) to send to the texter.

In another embodiment, the software on the receiver's phone could analyze the video and edit the photo to crop out background and center the video on the receiver's face. If multiple faces are seen, the software would focus on the one oriented to be reading the text (in case the phone is sitting on a table and multiple faces appear in the video). If multiple faces appear in the video and all seem to be looking at the text, then the software may capture all of the faces in the video. Alternatively, the software could compare the video to a known picture of the receiver, and crop out all other faces except the receiver's.

Figure 2:
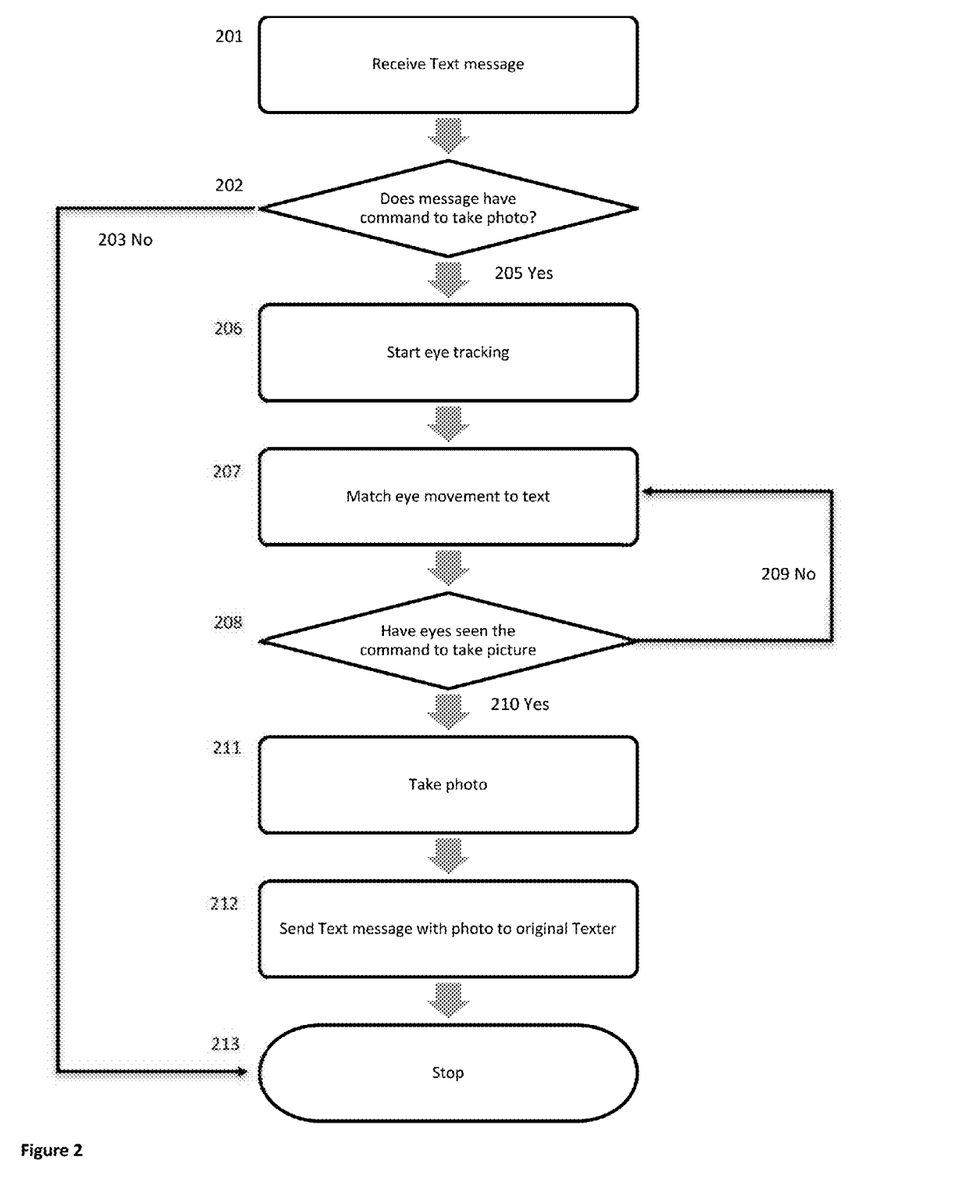
FIG. 2 is a flow chart of a possible implementation of the FaceBack system on the receiving cell phone.

In FIG. 2, we see an algorithm for the implementation of the invention on the receiver's phone 103. When the SMS message 102 is received by the text message application on the receiver's phone 103, a modification to the standard text message application receives the text message 201.

The message 102 is then parsed by the text message application to see if there is a metacharacter indicating that the video is to be turned on 202. If the video metacharacter is not present in the message 203, then the message 102 is processed as a normal SMS message 102.

However, if the video metacharacter is present 205, the user-facing camera on the phone 103 is turned on and algorithms on the phone are activated to track the receiver's eyes 206. Eye tracking algorithms can be found on phones such as the Samsung Galaxy S4.

If the receiver's phone 103 does not have an eye tracking feature, the text message application could turn on the video once the video metacharacter is displayed on the screen and could continue taking the video until the video off metacharacter reaches the top of the screen or until the text message is no longer displayed on the phone 103 screen.

If eye tracking is supported, the receiver's eyes are matched to the text 207 until the receiver's eyes reach the video metacharacter 208. While waiting until the eyes reach that portion of the text 209, the algorithm loops around matching the receiver's eyes to the text.

Once the eyes see the metacharacter 210, the user facing camera on the phone starts recording the video 211. The video continues recording, and the algorithm enters another loop seeking the point where the receiver's eyes see the video stop metacharacter. When the eye reads the video stop metacharacter, the recording stops. Some implementations may require a time delay between the reading of the video stop metacharacter and the actual stop of the recording to account for the delay in the receiver's brain from the time the eye sees the text and the time when the brain responds to what is read.

If the video stop metacharacter is not seen by the eyes before the text message is removed from the screen, then the video recording will stop at that point. This covers the case where the user switches the screen before finishing the reading of the message or when the video stop metacharacter is missing from the text message.

Once the video has stopped, the receiver's phone 103 will package the video in an SMS message 104 and send the message 212. The algorithm then returns to the normal SMS message processing 213.

The metacharacter could be displayed in the text message for the recipient to see or it could be hidden, depending upon the configuration of the text message processing application.

On some phones, the text message is visible on the lock screen of the phone, in the form of a notification, for instance, as soon as it arrives. On these phones, the receiver text software could monitor the phone's accelerometers to detect the movement from its resting place to a point where the user can view the screen, and which point the motion of the phone stabilizes while it is being held at a reading angle. On stability is noticed by the accelerometers, the video can start with the assumption being that the text is being read at that point.

Alternatively, under certain circumstances the phone would not be picked up when the video-requested text comes in because it is lying on a table and the text is clearly visible without picking it up. In this embodiment, when the phone was lying flat on a surface and a text message appears on the lock screen of the phone in the form similar to a notification, the phone's camera would then turn on in an attempt to capture the image of the recipient looking at the phone and reading the text without picking it up. If a metacharacter was embedded deeper in the text, such an image might not be taken as the sought after emotion could be captured later when the recipient picked up the phone and looked at the whole message.

Alternatively, to further refine when an image should be captured, the recipient's camera could turn on and try to use eye-tracking to discern if the message is being read by the recipient. The front-facing camera could be used to take the reaction-video even at such an oblique angle if necessary. If such eye-tracking software is not available, or if trying to track eye movements are too difficult to track at that angle, then head-tracking software might be employed that would look for the general head orientation to determine if the user is looking at the screen as an indication of when to start recording.

In another embodiment, the receiver's phone has facial recognition software operating. Facial recognition software is available on the market, for instance FaceReader 6 from Noldus Information Technology could provide software that detects emotions and changes in emotions. The facial recognition software observes the receiver's face as he reads the text message, and captures the video when the receiver's face reacts to the text message. The camera in this embodiment would ideally watch the user's face during the entire period that the text is being read. Shortly after reading the text, or parts of the text surrounding the metacharacter, the facial recognition software would review the facial expressions, watching the eyes, mouth, and other facial features to determine changes in expression as the text was read. When the expression changes markedly, the software would excise such segments or images and use them in constructing the response text to be sent back to the texter. During the reading of a single text message, there may be several changes in expression; the software could collect each change or could chose the photo with the most significant change to the expression.

Alternatively, the recipient would be allowed to review the images generated and pick one or more photos, or some or all of the video segment to send back to the texter.

Alternatively, the metacharacter could indicate what type of expression the texter was looking for (a laugh, for instance) and the software could pull out the best instance of such an expression. Such specification of desired responses could be set for a specific text, or a specific recipient, or for all texts sent by a given texter. Response specifications could include types or intensities of emotions.

If no specific type of emotion was being looked for by the texter, the software could look for any change in emotion when the recipient read the text content associated with the metacharacter. There could exist specified thresholds of change that needed to be exceeded for a response to be worthy of being sent back. Such thresholds could vary by recipient and be set by the texter.

In another embodiment, the texter could have set a minimum threshold for a given expression. If the facial recognition software did not deem that a reaction met that threshold of reaction then no reaction text would be sent back to the texter. Different expressions could have different thresholds for a given texter. And different recipients could have different thresholds for a given texter or different thresholds for a given emotion.

Furthermore, when the texter receives such response images, the texter may indicate, perhaps by tapping with a thumbs-up or down icon that that was the reaction the texter was looking for. With such a feedback loop the texter could help calibrate the system to better filter out expressions desired by the texter.

In one embodiment, the response text would be generated and sent to the server, however not sent on to the texter. In this embodiment, the texter could "retrieve" the response images later via a "pull" process. That is, the texter could specify the text to which a response image was desired and the response image could then be sent to that texter. Such retrieval might be through viewing on a website, via an email, or it could be in the form of a text overlaid on the text conversation with the recipient.

In another implementation, the recipient would see some indication on their display that a certain section of a text had been designated for a response text. Such an indication might be a flash of some sort associated with the metacharacter, such flash resembling or alluding to a camera's flash going off. Another method might be to bold or flash the text. Such indicators might come slightly before the material was read (indicating it's importance to the texter and that a response is expected) or the indication might come after reading giving this information to the recipient after the relevant material had already been read.

Over time, the system could provide summary data to the texter as to what types and numbers of reactions he or she was getting from any given recipient and how that might be changing over time. AI software could be employed to analyze the content of texts sent and then associate such content with the reactions received.

In one embodiment of the invention, no metacharacters would be used at all. All facial reactions would be recorded for all received texts and the facial recognition software would be used to cull out all those reaction expressions that met certain thresholds and use them as the basis for texts to be sent back to the texter.

As described thus far, the invention requires both texter and recipient to opt in to the application, presumably downloading a new text application to set up both sides of the exchange of texts and responses to said texts. However, the invention could also be implemented, in part by a willing recipient. Such recipient could employ a text application with a facial emotion recognition component. Every time such a recipient received a text—from anybody or only certain persons or classes of persons—the front facing camera would turn on and start to record looking for an outstanding emotion of some type. When found, such images, photos or videos or both, could be used to automatically construct a reply text. The original texter would not need to have installed the app used by the recipient to receive and enjoy such a reply text. The recipient could have the option to decline sending such a text or could add additional text to it and annotate the text in other ways before sending.

One such way that the reply text images could be annotated would be to use photo-editing techniques to change the photo. For instance, if the text caught the person with unkempt hair, perhaps a hat could be added to the picture. The reply text could also include a note advertising the app that produced such a text and in such way make the spread of the app that much more viral.

Figure 3:
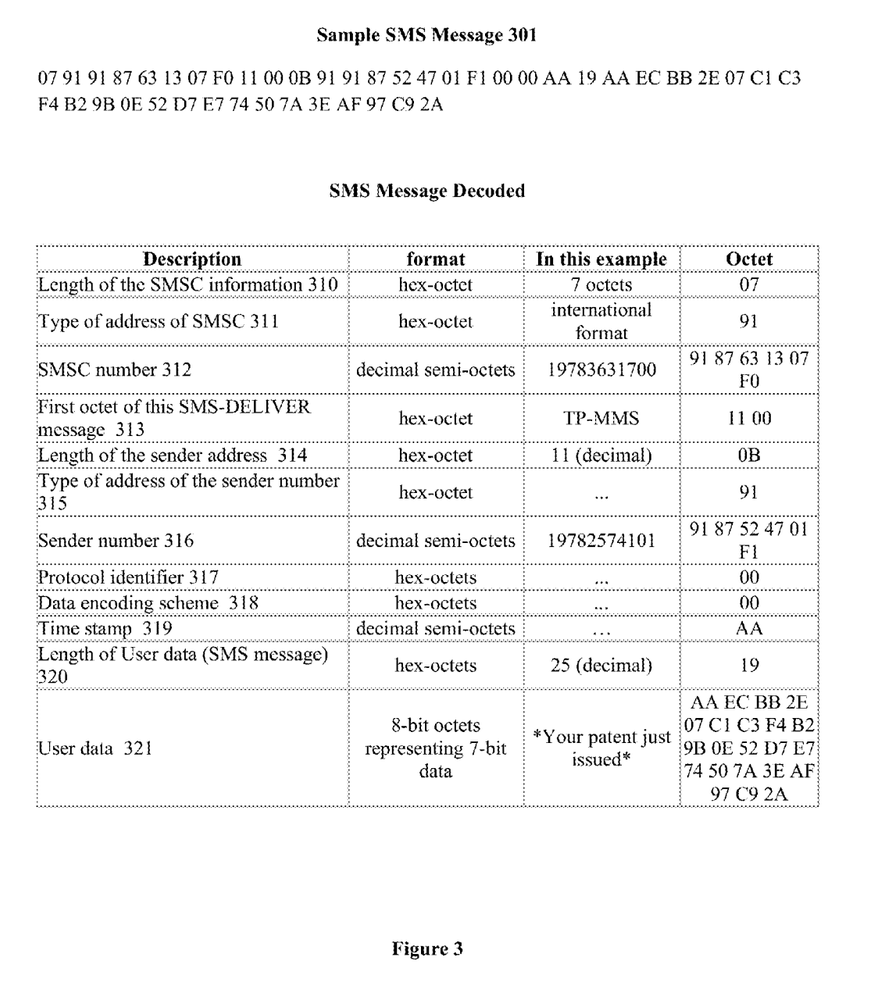
FIG. 3 is an example of a SMS packet containing the commands to take start a video and stop taking the video and decoded details of the message.

FIG. 3 shows a sample SMS message 301 encoded to take a video. In this example, the "*" character is used to both turn on and turn off the video recorder. In some embodiments, it is envisioned that a single metacharacter will be used to both turn on and turn off the video camera. As discussed, the metacharacter may or may not be visible to the recipient when the text comes in but would be readable by the texting app on that person's phone.

FIG. 3 displays a sample SMS message 301 message in hexadecimal format. This SMS message 301 is then decoded in the table below. With the exception of the video metacharacter, this is a standard SMS message.

The SMS message 301 starts with the length of the SMSC information 310. The type of the SMSC number 311 and the SMSC number 312 itself represent the destination phone number. This is where the SMS message 301 is to be sent to. The SMSC length 310 is an 8 bit value specifying the length of the next two fields, in this case 7 bytes (a byte is 8 bits in length). The SMSC type 311 is 0x91, specifying an international format phone number. Other types of numbers can be found in the GSM 03.40 standard. The SMSC number 312 is 6 bytes long, and has the nibbles reversed, commonly called Little-endian format.

The sender address 316, type of sender address 315 and length of sender address 314 follow the same rules as for the SMSC address. The sender address 316 specifies the address of the SMS message 301 sender.

The protocol identifier 317 either refers to the higher layer protocol being used, indicates interworking with a certain type of telematic device (like fax, telex, pager, teletex, e-mail), specifies replace type of the message or allows download of configuration parameters to the SIM card. Plain SMS messages have protocol identifier set to 0x00. Further details can be found in the found in the GSM 03.40 standard.

The data encoding scheme 318 specifies the data encoding of the message. Typical Latin based language SMS messages use a 7 bit encoding and insert 0x00 in this field. Other options are 8 bit encoding and 16 bit encoding, typically used for Chinese, Korean or Japanese languages.

The next part of the SMS message 301 is the time stamp 319. This is followed by the length of the SMS data 320. This is a count of the number of characters of user data 321. Note that this is not a count of the bytes in the user data, as the characters are packed using 7 bits per character, so each byte contains bits for two characters.

The user data 321 contains the user's text message packed into 7 bit format in this example, although the message could be coded in 8 bit or 16 bit format as described above. Standard algorithms for packing 7 bit SMS messages can be found on the internet. The notable distinction here is that the user data 321 contains two "*" characters which, for this embodiment, we have specified as the metacharacter for remotely turning on and off the user facing video camera on the receiver's phone 103.

In another embodiment, the SMS header will be modified to indicate that a video is to be taken. This modification could be the addition of a bit that indicates that a video is to be taken. In another embodiment. The SMS header could add a field indicating when to start the video. This value could indicate how many seconds of delay should occur before the video starts, or the percentage of message is to be read before starting the video.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A method for capturing a reaction to an incoming SMS message, said method comprising:
   receiving the incoming SMS message on a receiving device from a sending device, wherein the incoming SMS message is encoded in a SMS protocol;
   scanning a user data section of the incoming message for a metacharacter;
   the metacharacter instructing a camera on the receiving device to capture an user image using said camera,
   if the metacharacter is included in the incoming SMS message,
   capturing the user image using the camera on the receiving, and
   sending the user image, using an outgoing SMS message, to the sending device.

2. The method for capturing a reaction to an incoming SMS message of claim 1 wherein the user image is a portion of a video.

3. The method for capturing a reaction to an incoming SMS message of claim 1 wherein the user image is one of a series of photographs.

4. The method for capturing a reaction to an incoming SMS message of claim 1 further comprising delaying the capture of the user image for a period of time.

5. The method for capturing a reaction to an incoming SMS message of claim 1 further comprising delaying the capture of the user image until a user's eye reaches a specified point the incoming SMS message.

6. The method for capturing a reaction to an incoming SMS message of claim 1 further comprising delaying the capture of the user image until a user's facial expression changes.

7. The method for capturing a reaction to an incoming SMS message of claim 1 further comprising prompting a user before sending said outgoing SMS message.

8. An apparatus for capturing a reaction to an incoming SMS message, said apparatus comprising:
   a receiving device;
   a processor on the receiving device;
   a memory connected to the processor;
   a camera on the receiving device electrically connected to the processor, said camera responsive to a metacharacter instruction from the processor to collect an user image and store the user image in the memory;
   a network interface on the receiving device electrically connected to the processor, the network interface configured to receive incoming SMS messages and sending outgoing SMS messages;
   a screen on the receiving device electrically connected to the processor, configured to display incoming SMS messages;
   software stored in the memory of the receiving device for scanning a user data section of the incoming SMS messages for the metacharacter instruction to take the user image, said software further configured to instruct the camera to collect the user image and to send outgoing SMS messages containing the user image through the network interface.

9. The apparatus for capturing a reaction to an incoming SMS message of claim 8 wherein the user image is part of a video.

10. The apparatus for capturing a reaction to an incoming SMS message of claim 8 wherein the user image is one of a series of photographs.

11. The apparatus for capturing a reaction to an incoming SMS message of claim 8 wherein the instruction is located in a body of the incoming SMS message.

12. The apparatus for capturing a reaction to an incoming SMS message of claim 8 wherein the software further includes an eye tracking algorithm.

13. The apparatus for capturing a reaction to an incoming SMS message of claim 8 wherein the software further includes facial recognition software.

14. The apparatus for capturing a reaction to an incoming SMS message of claim 8 wherein the software further includes prompting a user before sending the image via the outgoing SMS message.

15. The apparatus for capturing a reaction to an incoming SMS message of claim 8 wherein the software further edits the images.

16. The apparatus for capturing a reaction to an incoming SMS message of claim 8 wherein the software further compares the image and determines which image to send in the outgoing SMS message.

* * * * *

UNITED STATES PATENT AND TRADEMARK OFFICE
CERTIFICATE OF CORRECTION

PATENT NO. : 9,288,303 B1  
APPLICATION NO. : 14/857777  
DATED : March 15, 2016  
INVENTOR(S) : James D Logan and Richard A Baker, Jr.

Page 1 of 1

It is certified that error appears in the above-identified patent and that said Letters Patent is hereby corrected as shown below:

In the Claims:

Column 9 line 42 claim 1, add the word "device" after the word "receiving"
Column 9 line 46-47 claim 2, delete the words "for capturing a reaction to an incoming SMS message"
Column 9 line 49-50 claim 3, delete the words "for capturing a reaction to an incoming SMS message"
Column 9 line 52-53 claim 4, delete the words "for capturing a reaction to an incoming SMS message"
Column 9 line 55-56 claim 5, delete the words "for capturing a reaction to an incoming SMS message"
Column 10 line 1-2 claim 6, delete the words "for capturing a reaction to an incoming SMS message"
Column 10 line 4-5 claim 7, delete the words "for capturing a reaction to an incoming SMS message"
Column 10 line 31-32 claim 9, delete the words "for capturing a reaction to an incoming SMS message"
Column 10 line 34-35 claim 10, delete the words "for capturing a reaction to an incoming SMS message"
Column 10 line 37-38 claim 11, delete the words "for capturing a reaction to an incoming SMS message"
Column 10 line 40-41 claim 12, delete the words "for capturing a reaction to an incoming SMS message"
Column 10 line 43-44 claim 13, delete the words "for capturing a reaction to an incoming SMS message"
Column 10 line 46-47 claim 14, delete the words "for capturing a reaction to an incoming SMS message"
Column 10 line 50-51 claim 15, delete the words "for capturing a reaction to an incoming SMS message"
Column 10 line 53-54 claim 16, delete the words "for capturing a reaction to an incoming SMS message"

Signed and Sealed this  
Thirty-first Day of May, 2016

Michelle K. Lee  
*Director of the United States Patent and Trademark Office*